US011755989B2

(12) United States Patent
Rodriguez et al.

(10) Patent No.: US 11,755,989 B2
(45) Date of Patent: Sep. 12, 2023

(54) PREVENTING THEFT AT RETAIL STORES

(71) Applicant: Toshiba Global Commerce Solutions Holdings Corporation, Tokyo (JP)

(72) Inventors: Adrian Rodriguez, Durham, NC (US); Glenn Rathje, Wake Forest, NC (US); Patricia Thomas, Cary, NC (US); Charles Krupinski, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/832,964

(22) Filed: Mar. 27, 2020

(65) Prior Publication Data

US 2021/0304173 A1 Sep. 30, 2021

(51) Int. Cl.

*G06Q 10/08* (2023.01)
*G06Q 20/18* (2012.01)
*G06Q 20/20* (2012.01)
*G06V 20/52* (2022.01)
*G06V 10/74* (2022.01)
*G08B 13/196* (2006.01)
*G06Q 10/087* (2023.01)
*G06F 18/22* (2023.01)

(52) U.S. Cl.

CPC ........... *G06Q 10/087* (2013.01); *G06F 18/22* (2023.01); *G06Q 20/18* (2013.01); *G06Q 20/208* (2013.01); *G06V 10/761* (2022.01); *G06V 20/52* (2022.01); *G08B 13/19641* (2013.01)

(58) Field of Classification Search

CPC .... G06Q 20/208; G06Q 10/087; G06Q 20/18; G06Q 20/10; G06K 9/6215; G08B 13/19641; G08B 13/19613; G08B 13/19645; G06V 10/761; G06V 20/52; G07G 1/0054; G07G 1/0063; G07G 3/003; G06F 18/22

See application file for complete search history.

(56) References Cited

U.S. PATENT DOCUMENTS 7,516,888 B1 4/2009 Kundu et al.
8,117,071 B1 2/2012 Fitch et al.

(Continued)

FOREIGN PATENT DOCUMENTS

EP 1337962 B1 9/2012

OTHER PUBLICATIONS pointofsale.com, “Self Checkout: Too Easy to Steal?”, Mar. 30, 2012, pp. 1-12, retrieved on Mar. 12, 2020, retrieved from internet: https://pointofsale.com/20120330977/Point-of-Sale-News/Self-Checkout-Too-Easy-to-Steal.html.

(Continued)

*Primary Examiner* — Paul Danneman

(74) *Attorney, Agent, or Firm* — COATS & BENNETT, PLLC

(57) ABSTRACT

A computing device is associated with a retail store. As a customer scans his/her items for purchase, images of a bag containing the items are captured and sent to the computing device to be digitally processed. Based on the processing, the computing device identifies the item(s) the customer intends to purchase, and determines whether there are any other items in the container that are different from the first item. If so, the computing device outputs a signal indicating the presence of the second item in the container.

19 Claims, 11 Drawing Sheets

60

START

62 STORING, IN A DATABASE, INFORMATION DESCRIBING CHARACTERISTICS FOR EACH OF A PLURALITY OF INVENTORY ITEMS

64 DETERMINING ONE OR MORE CHARACTERISTICS OF THE FIRST ITEM BASED ON THE DIGITAL IMAGE ANALYSIS

66 COMPARING THE ONE OR MORE CHARACTERISTICS OF THE FIRST ITEM TO THE CHARACTERISTICS OF AN INVENTORY ITEM

68 CALCULATING A FIRST CONFIDENCE VALUE INDICATING AN EXTENT TO WHICH THE ONE OR MORE CHARACTERISTICS OF THE FIRST ITEM MATCHES THE CHARACTERISTICS OF THE INVENTORY ITEM

70 IDENTIFYING THE FIRST ITEM AS BEING THE INVENTORY ITEM RESPONSIVE TO DETERMINING THAT THE FIRST CONFIDENCE VALUE EQUALS OR EXCEEDS A FIRST CONFIDENCE THRESHOLD

END

(56) References Cited

U.S. PATENT DOCUMENTS

| | | | | |
|---|---|---|---|---|
| 9,355,308 | B2 | 5/2016 | Fan et al. | |
| 9,600,982 | B2 | 3/2017 | MacIntosh | |
| 2002/0096564 | A1 * | 7/2002 | Bellis, Jr. ................ | A47F 9/047<br>235/382 |
| 2008/0018738 | A1 | 1/2008 | Lipton et al. | |
| 2008/0235102 | A1 | 9/2008 | Harris et al. | |
| 2010/0158310 | A1 * | 6/2010 | McQueen ................ | G06K 9/00<br>382/100 |
| 2012/0321146 | A1 | 12/2012 | Kundu et al. | |
| 2015/0054959 | A1 | 2/2015 | He et al. | |
| 2016/0063821 | A1 * | 3/2016 | MacIntosh ............. | G06V 20/10<br>705/23 |
| 2016/0189277 | A1 * | 6/2016 | Davis ................. | G06Q 30/0633<br>705/26.8 |
| 2016/0371669 | A1 | 12/2016 | Costello et al. | |
| 2017/0190341 | A1 * | 7/2017 | Kobayashi ................ | B62B 3/02 |
| 2018/0060656 | A1 | 3/2018 | Saptharishi et al. | |

OTHER PUBLICATIONS

Rocha, A. et al., “Automatic Fruit and Vegetable Classification From Images”, Computers and Electronics in Agriculture, vol. 70 Issue 1, Jan. 1, 2010, pp. 96-104, Elsevier.

Liu, X. et al., “The Recognition of Apple Fruits in Plastic Bags Based on Block Classification”, Precision Agriculture, vol. 19 Issue 4, Aug. 1, 2018, pp. 735-749, Springer, Abstract Only.

* cited by examiner

PREVENTING THEFT AT RETAIL STORES

TECHNICAL FIELD

The present disclosure relates generally to checkout systems in retail establishments, and more particularly to systems for preventing the theft of items by a customer in a retail establishment.

BACKGROUND

Many retailers utilize self-checkout (SCO) stations as an alternative to conventional attendant-assisted checkout lanes. As is known in the art, SCO stations allow customers to process their own purchases. Particularly, customers use a SCO station to scan, and sometimes weigh, the items they would like to purchase before placing the items in a bagging area. Once all items have been scanned, customers utilize the SCO station to apply payment.

While useful, SCO stations are susceptible to facilitating theft by dishonest self-service checkout customers. For example, consider a dishonest customer that places both non-produce items (e.g., bottles of aspirin) and produce items (e.g., bananas) in the same bag. At the SCO station, the dishonest customer scans a Price Look-Up (PLU) code only for the produce items, but weighs the bag containing both the produce and the non-produce items. The measured weight would, therefore, reflect the weight of both the produce and the non-produce items. However, although the non-produce item(s) are more expensive than the produce items, they are also much lighter. Therefore, the weight added to that of the produce items is insignificant. As such, the dishonest customer essentially pays for the produce items, but not for the non-produce items.

A similar scenario can occur in so-called “frictionless” retail stores. Such stores, as known in the art are largely free of staff. In these systems, customers simply walk in, grab the items they wish to purchase, and then walk out without having to interact with a conventional checkout system. Cameras in the stores capture images of the items selected by the customers and charge the customer’s account for those items.

However, frictionless systems are just as susceptible to the same or similar types of problems experienced by conventional checkout systems. Particularly, out of sight of a camera, dishonest customers can place higher-price items (e.g., the bottle of aspirin) into the same container as the less expensive items (e.g., bananas). Because the cameras would not capture the customer placing the higher-price items into his/her container, the customer could then pay only for the less expensive items.

DETAILED DESCRIPTION

Embodiments of the present disclosure provide a technique for preventing the theft of items from a retail store by customers. For example, consider a dishonest customer who wants to steal one or more higher-priced items (e.g., a bottle of aspirin). To do this, the customer might place the higher-priced items into a container (e.g., a bag) that also holds some lower-priced items (e.g., bananas). Then, when checking out, the customer scans a Price Look-Up (PLU) code for the lower-priced items and pays only for the lower-priced items.

In some cases, the lower-priced items are sold by weight, and therefore, must be placed on a scale by the customer in order to determine cost. In these cases, the total weight of the container would be equal to the combined weight of both the higher-priced items and the lower-priced items. However, the higher-priced items generally weigh much less than the lower-priced items. Therefore, the dishonest customer would essentially pay only for the lower-priced items. That is, the customer ends up paying for the higher-priced items at the weight of the lower-priced items.

The present embodiments, however, help prevent such theft by capturing images of a customer’s container during the checkout process. The captured images are then analyzed to identify the items the customer intends to purchase, and to determine whether the customer has placed any other items in the container. If the analysis reveals that the customer has placed other items in the container, a signal is output to indicate the presence of the second item in the container. The signal may be, for example, a message that is sent to a store operator indicating that the customer’s container should be audited. Alternatively, the signal may be a control signal that causes the checkout station the customer is using to add the other items to the customer’s order. In either case, the incidence of customer theft is either prevented entirely or greatly reduced.

Figure 1:
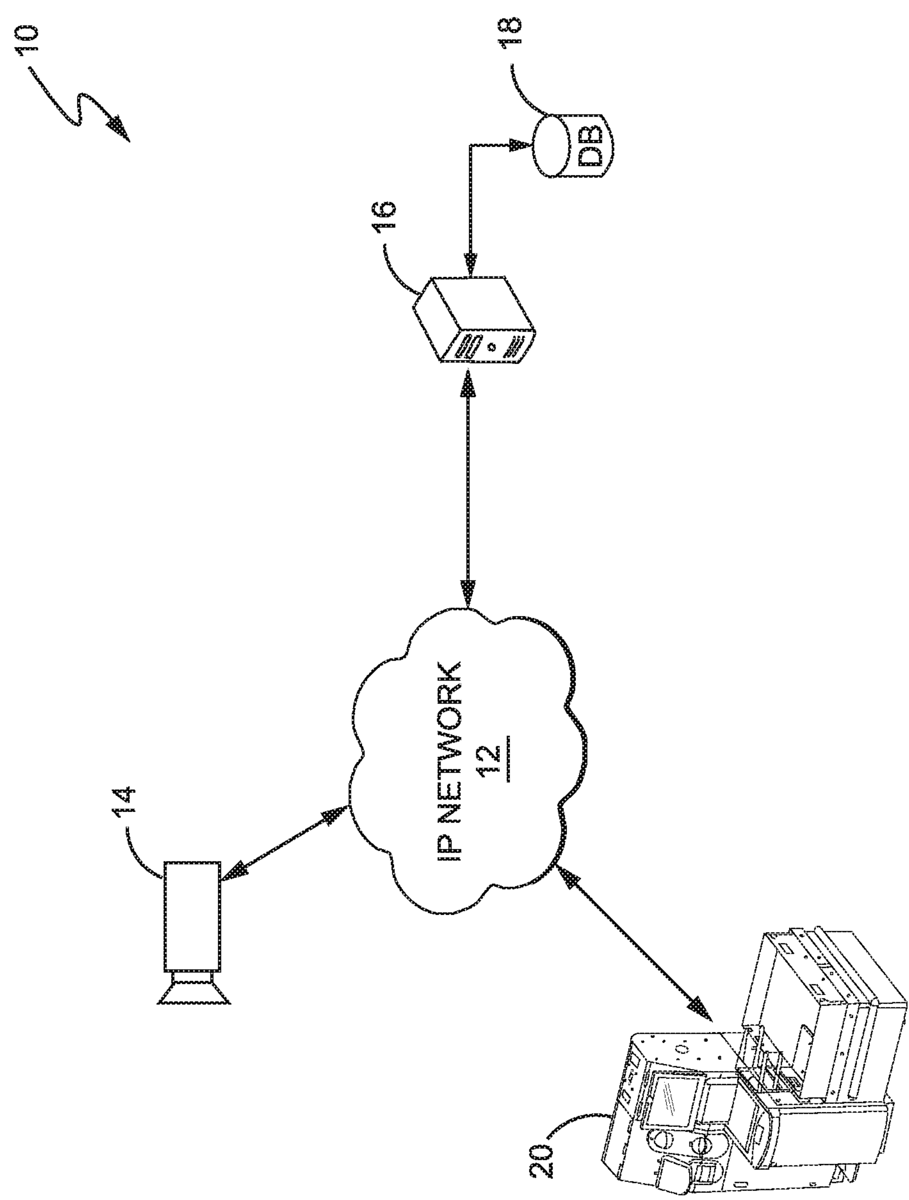
FIG. 1 is block diagram illustrating a communications system configured according to one embodiment of the present disclosure.

Turning now to the drawings, FIG. 1 is block diagram illustrating a communications system 10 configured according to one embodiment of the present disclosure. Those of ordinary skill in the art will readily appreciate that the components illustrated in FIG. 1 are illustrative only, and that other components may or may not be present in system 10. Regardless, system 10 is associated with a retail store, and is configured according to the present embodiments to help prevent the theft of items by customers by analyzing images of the customer's container during the checkout process.

As seen in FIG. 1, system 10 comprises an IP network 12 communicatively connecting a plurality of camera devices 14, a network node (e.g., a computer server) 16, a database (DB) 18, and in this embodiment, a self-checkout (SCO) station 20. The IP network 12 comprises one or more private and/or public IP networks (e.g., the Internet) configured to carry information as data packets. IP network 12 may operate according to any protocol known in the art, but in at least one embodiment, carries data packets between components using the well-known TCP/IP protocol.

Camera 14 comprises one or more security cameras mounted throughout the store (e.g., mounted in the ceiling). Generally, cameras 14 are utilized to capture images and video of customers as they enter and exit the store, and as they move through the store selecting items for purchase. In one or more embodiments, however, cameras 14 are positioned over a checkout station, such as SCO station 20, for example, and utilized to capture one or more images of a container as the customer places the container on SCO station 20. The images captured by camera 14 are then sent to network node 16 for analysis.

Network node 16 comprises a computer, such as a computer server, configured to digitally analyze the images received from camera 14. In particular, network node 16 is configured to utilize any digital image analysis algorithm known in the art to identify the contents of the container placed on SCO station 20, including a first item (e.g., bananas) the customer wants to purchase, and to determine whether the container may include a second different item (e.g., a bottle of aspirin) that the customer may be trying to steal. As will be described later, this determination may be based, in part, on information stored in DB 18 and/or on information provided by the customer at SCO 20.

Determining that the container may contain more than one type of item (e.g., both the bananas and the bottle of aspirin) triggers network node 16 to perform a predetermined action. In one embodiment, for example, network node 16 signals an indication to a store operator (e.g., sends a message) indicating that the container may have items that the customer did not purchase in addition to the items the customer did purchase. In this manner, network node 16 is configured to alert the store operator so that he/she can audit the customer before they leave the store. In this embodiment, network node 16 need only identify the first item in the container, and is not required to positively identify the second item in the container. Rather, network node 16 need only determine that the second item in the container is not the same as the first item in the container. This is because the store operator will be able to verify whether the customer actually did try to steal the second item upon performing the customer audit.

In another embodiment, network node 16 positively identifies the second item in the container, and then generates a control signal to send to the SCO station 20. The control signal may be, for example, a message having a parameter that identifies the second item, and that controls SCO station 20 to automatically charge the customer for the second item.

Figure 2:
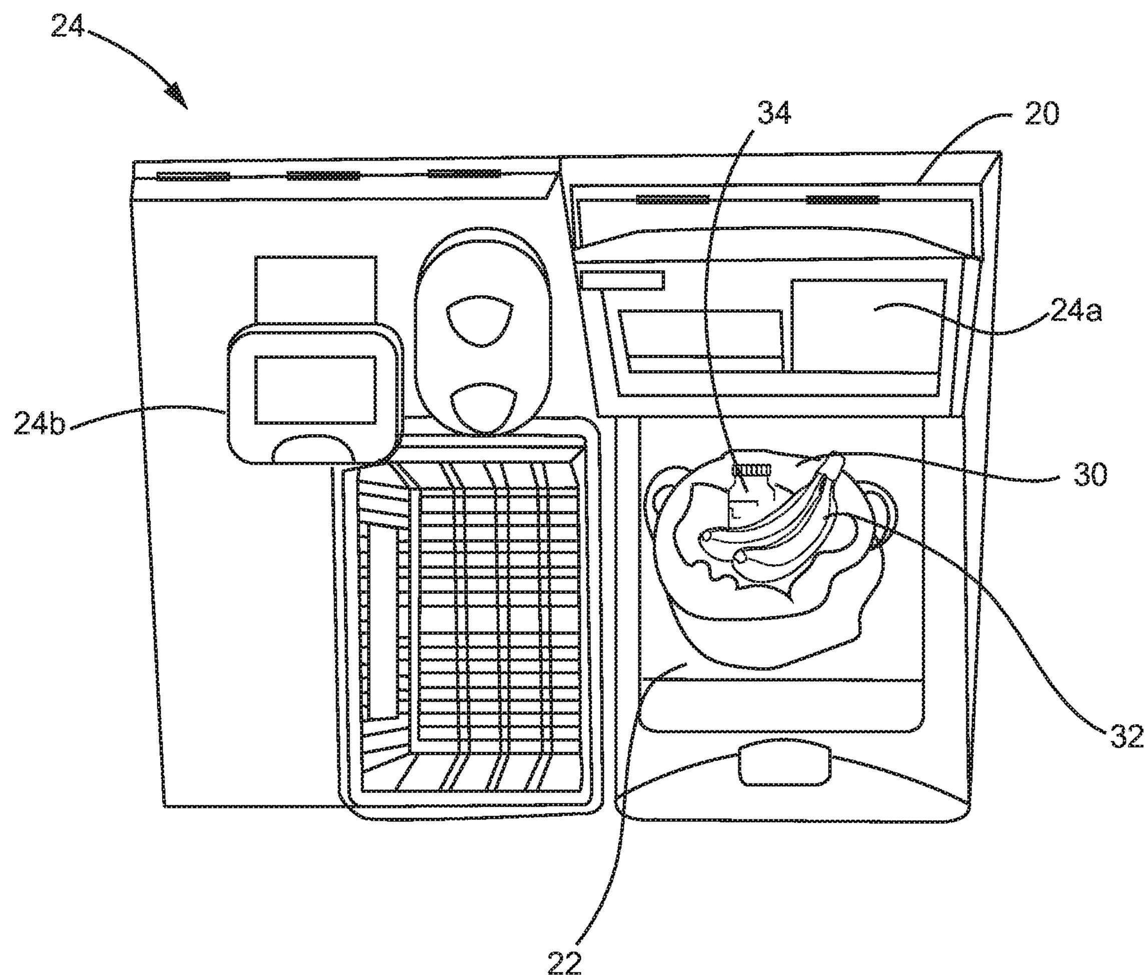
FIG. 2 is a top view of a plurality of different items placed in a container and placed on a scale/scanner device of a self-checkout (SCO) station configured according to one embodiment of the present disclosure.

SCO station 20 may comprise any known self-checkout station known in the art. The particular components that comprise a suitable SCO station 20 are not germane to the present disclosure; however, as seen in FIG. 2, most SCO stations 20 will comprise a scale 22, an optical scanner (not shown), and a user interface 24 that allows customers to interact with the SCO station 20. In this embodiment, the user interface 24 of SCO station 20 comprises a display device 24*a* that allows the customer to view the items being scanned, and a pinpad 24*b* that allows the customer to render payment for the items being purchased.

As seen in FIG. 2, the customer places items, such as a bunch of bananas 32, in a container 30. In cases of produce, container 30 is also placed on scale 22 of SCO station 20 so that a total cost for the bananas 22 can be calculated. Normally, honest customers would place only the bananas 32 in container 30 so that the measured weight reflects only that of the bananas 32. However, dishonest customers have been known to place secondary items, such as bottle 34, into the same container 30. As previously described, these secondary items are not the same as the items the customer intends to purchase (e.g., bananas 32). Further, they are also more expensive and far lighter than the items the customer intends to purchase. For example, the weight of the pill bottle 34 is insignificant compared to the weight of the bananas 32. Thus, by scanning only the Product Look Up (PLU) code for the bananas 32, and by weighing both the pill bottle 34 and the bananas 32 together, the dishonest customer essentially pays only for the bananas 32. Embodiments of the present disclosure address such situations.

Figure 3:
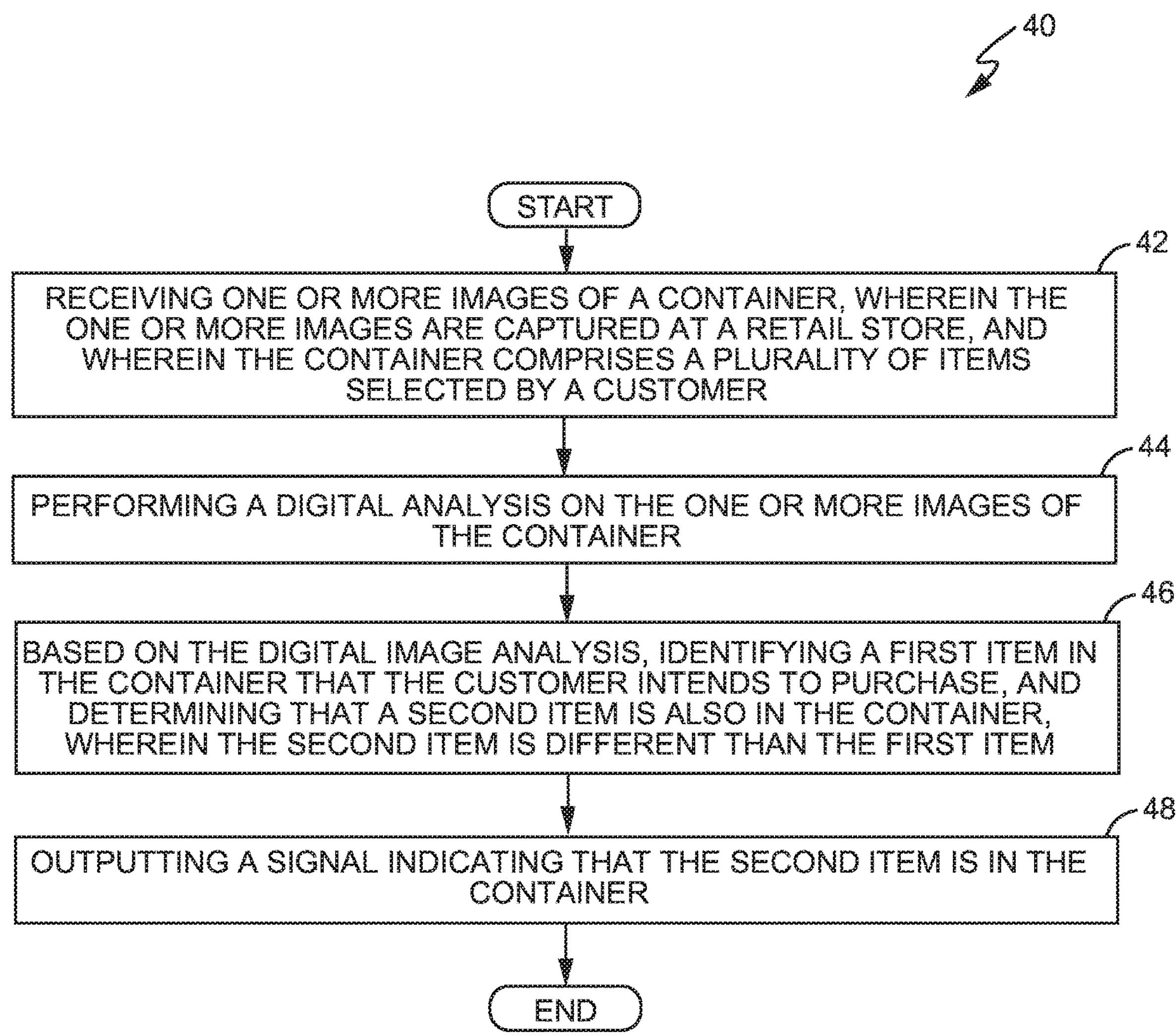
FIG. 3 is a flow diagram illustrating a method of preventing theft at a retail store according to one embodiment of the present disclosure.

More particularly, FIG. 3 is a flow diagram illustrating a method 40 of preventing theft at a retail store according to one embodiment of the present disclosure. In this embodiment, method 40 is implemented at network node 16; however, those of ordinary skill in the art should readily appreciate that the present disclosure is not so limited. In other embodiments, method 40 is implemented by a computer associated with a checkout station, such as SCO station 20, for example.

Method 40 begins with network node 16 receiving one or more images of a container 30 in which a customer has placed a plurality of items (e.g., bananas 32 and pill bottle 34) for purchase (box 42). The one or more images may be captured, for example, by a camera 14 and sent to network node 16 via network 12. Responsive to receiving the images, network node 16 performs a digital image analysis on the one or more images (box 44). Based on that analysis, network node 16 identifies a first item in container 30 that the customer intends to purchase (e.g., bananas 32), and determines whether a second item (e.g., pill bottle 34) is also in the container 30 (box 46). The second item in the container is different from the first item in the container. Responsive to determining that the second item is also in the container, network node outputs a signal indicating that the second item is in the container (box 48).

Figure 4:
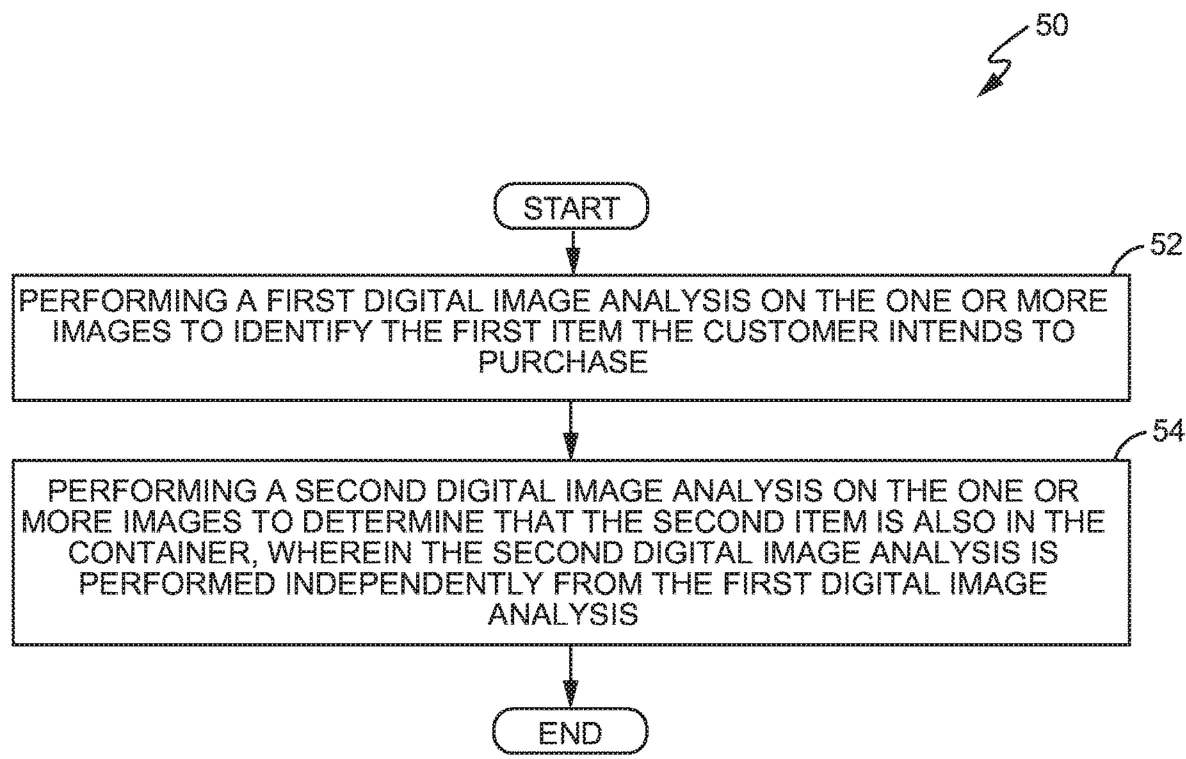
FIG. 4 is a flow diagram illustrating a method of performing a digital image analysis on one or more images of a container according to one embodiment of the present disclosure.

FIG. 4 is a flow diagram illustrating a 50 method for performing the digital image analysis on the one or more images according to one embodiment of the present disclosure. As seen in FIG. 4, network node 16 performs a first digital image analysis on the one or more images to identify the first item the customer intends to purchase (box 52). In some embodiments, the first item is identified based on the results of digital image analysis. In other embodiments, however, network node 16 receives input from the customer and uses that input to identify the first item. For example, the customer may scan a PLU of the first item using scanner 22, or use a pinpad or touch screen display to manually enter an item identifier. Regardless of what the customer enters, the input can be used to help identify the first item.

Once the first item has been positively identified, network node 16 performs a second digital image analysis to determine whether a second item is also in the container (box 54). In this pass, it is not required for network node 16 to positively identify the second item, although as seen later, such identification is possible. Rather, all that is needed of network node 16 in this embodiment is to determine that the second item in the container 30 is different than the first item in container 30. In such cases, the network node 16 can determine that the customer may be stealing the second item and, at the least, output a signal to a store manager to audit the customer.

In method 40, the network node 16 performs the first and second digital image analyses independently of each other. That is, network node 16 processes the one or more images a first time to identify the first item in container 30, and then processes the same one or more digital images a second time to determine whether the customer has placed anything else in container 30. However, the present embodiments are not so limited. In other embodiments, for example, network node 16 analyzes the one or more images once, and uses the results of that single analysis to both identify the first item and to determine whether a second item is also in container 30.

Figure 5:
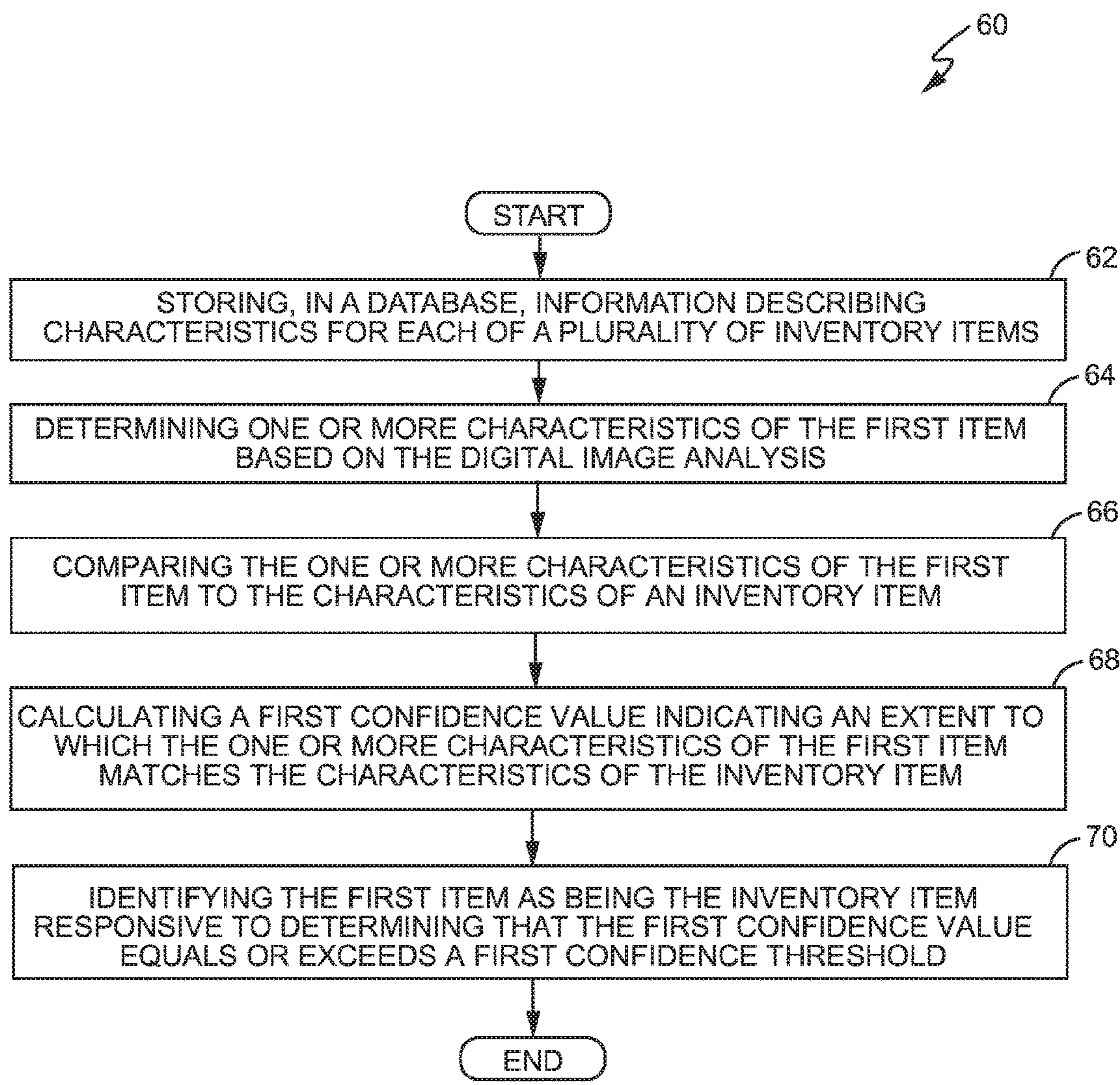
FIG. 5 is a flow diagram illustrating a method for identifying a first item the customer intends to purchase according to one embodiment of the present disclosure.

FIG. 5 is a flow diagram illustrating a method 60 for identifying the first item the customer intends to purchase according to one embodiment of the present disclosure. As seen in FIG. 5, information describing the characteristics of each item in the retail store's inventory is stored in DB 18 (box 62). Such characteristics may include, but are not limited to, the price, size, shape, color, packaging details, PLUs, part numbers, weight, physical dimensions, alpha-numeric text printed on the item and/or its packaging, images of the item, and the decoded version of any optically encoded data printed on the item and/or its packaging. Upon receiving the one or more images of container 30, network node 16 performs the digital image analysis and, based on that analysis, determines one or more characteristics of the first item in container 30 (box 64). The characteristics may be the same or similar to any of the characteristics previously described as being stored in DB 18. Network node then compares the one or more characteristics of the first item to those stored in DB 18 (box 66), and based on that comparison, calculates a first confidence value indicating the extent to which the characteristics of the first item match those of an inventory item in DB 18 (box 68). The first confidence value may be computed using any method known in the art, but in one embodiment, is calculated using the following formula.

$$CV_1 = \frac{C_{item1}}{C_{inventory}}$$

where:

$CV_1$ is the computed first confidence value;

$C_{item1}$ is the number of characteristics of the first item that match the characteristics of a given inventory item; and $C_{inventory}$ are the number of characteristics stored in DB 18 for the given inventory item.

Network node 16 then compares each calculated value to a first predetermined threshold value. Responsive to determining that the calculated confidence value equals or exceeds the first predetermined threshold value, network node 16 identifies the first item in container as being the corresponding inventory item (box 70). In cases where more than one calculated value equals or exceeds the first predetermined threshold value, network node 16 may be configured to identify the first item as being the inventory item associated with the highest calculated confidence value.

Figure 6:
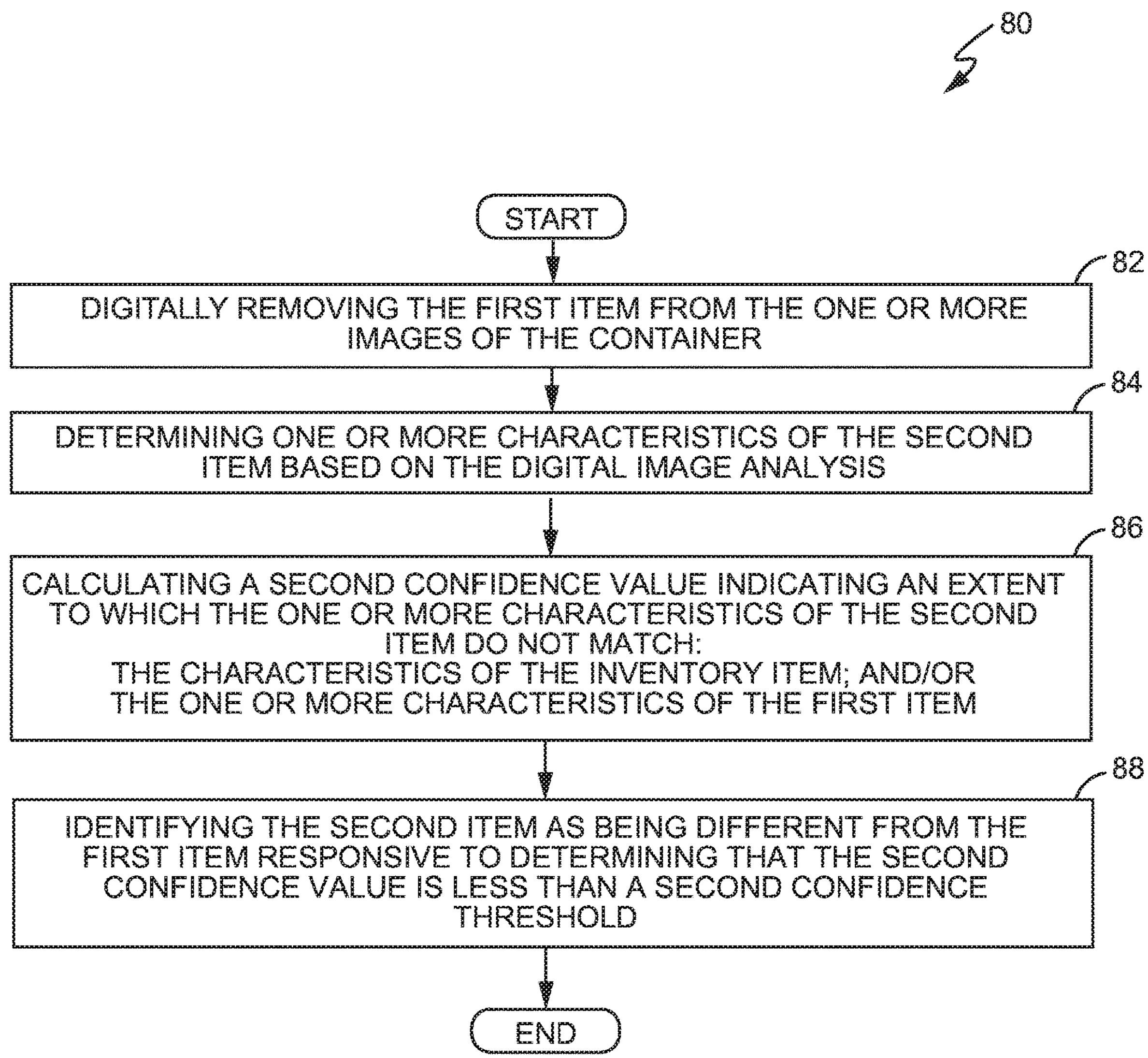
FIG. 6 is a flow diagram illustrating a method for determining whether a second item is also in the container according to one embodiment of the present disclosure.

FIG. 6 is a flow diagram illustrating a method 80 for determining whether a second item is also in the container according to one embodiment of the present disclosure. In this embodiment, network node 16 may first digitally remove or mask the first item from the one or more images of container 30 (box 82). To accomplish this, network node 16 may, for example, use any algorithm known in the art to set selected pixel values in the image (i.e., those pixels associated with the first item) to a predetermined value (e.g., 0) or some other background value. This leaves the pixels associated with the second item in container 30.

Once the first item has been digitally "removed" or masked from the one or more images, network node 16 can determine the characteristics of the second item (box 84). For example, network node 16 may determine that the one or more images now contain a substantially straight edge, a substantially right angle, or a substantially straight line. Detection of any of these characteristics may indicate the presence of packaging. Other characteristics that may be determined include, but are not limited to, color, weight, one or more physical dimensions, the presence of alpha-numeric text, and the presence of an optically encoded data object, such as a barcode or QR code, for example.

Once determined, network node 16 compares those characteristics to those of the identified first item and/or that of the inventory item used in determining the identity of the first item and calculates a second confidence value (box 86). The computed second confidence value indicates the extent to which the characteristics of the second item, if any, match those of the identified first item and/or that of the inventory item used in determining the identity of the first item. In one embodiment, the second confidence value is calculated using the following formula.

$$CV_2 = \frac{C_{item2}}{C_{item1}}$$

where:

$CV_2$ is the computed second confidence value;

$C_{item1}$ is the number of characteristics of the first item; and $C_{item2}$ is the number of characteristics for the second item that match the number of characteristics of the first item.

Because the second item, if present, is different from the first item, not many characteristics, if any, will match. Therefore, the computed second confidence value should be a low value. Network node 16 then compares the second confidence value to a second predetermined threshold value, and identifies the second item as being different than the first item if the second confidence value is less than the second predetermined threshold value (box 88). As above, there may be more than one calculated value that is less than the second predetermined threshold value. However, this does not matter. In this embodiment, all that is needed is for network node 16 to determine that whatever is in container 30 along with the first item is not the same thing as the first item. Such a determination is enough for network node to output a control signal (e.g., a message) to a store operator to audit the customer. In other words, this embodiment of the present disclosure does not particularly identify the second item, but merely indicates that the customer may be attempting to steal something.

As stated previously, the digital image analysis performed by network node 16 may be implemented on a single image or a set of one or more images captured by a camera 14.

Figure 7:
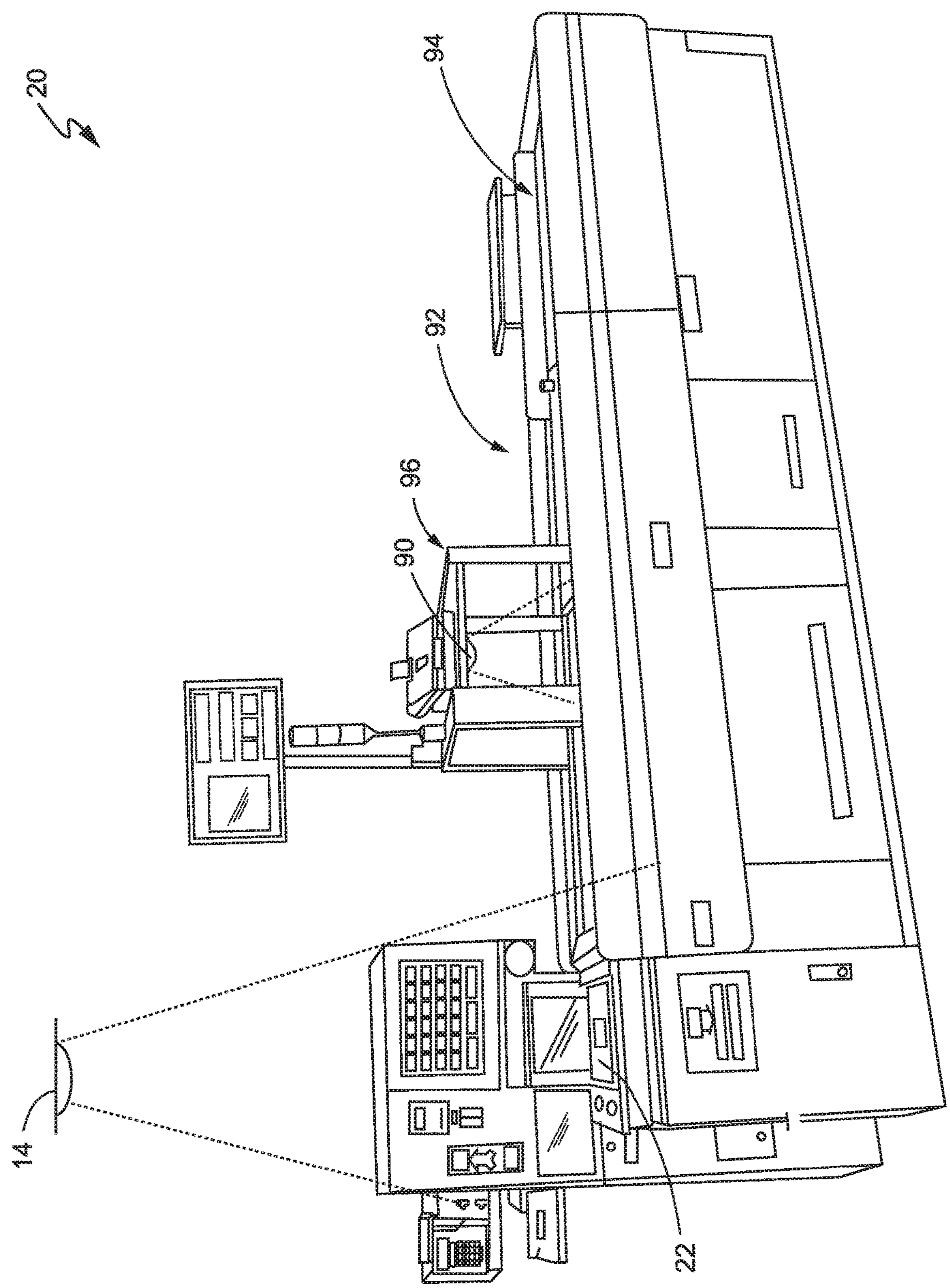
FIG. 7 is a perspective view of a self-checkout (SCO) station configured to perform an embodiment of the present disclosure.
Figure 8:
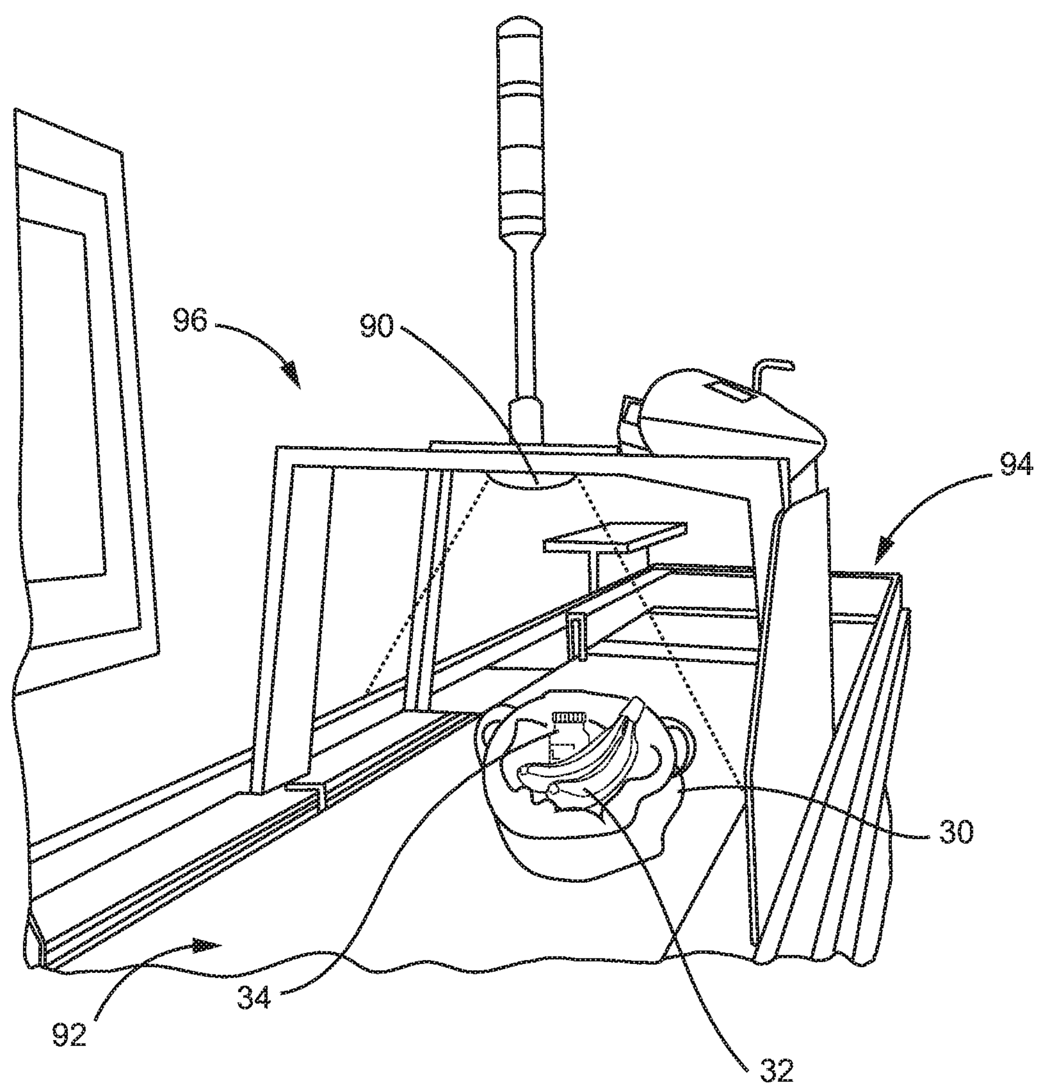
FIG. 8 is a perspective view of a tunnel associated with an SCO station configured to perform an embodiment of the present disclosure.

However, the present is not so limited. In some embodiments, the digital analysis is performed on a set of images that are captured independently of each other. Such an embodiment can be seen, for example, in FIGS. 7-8. Particularly, FIG. 7 is a perspective view of an SCO station 20 configured to perform an embodiment of the present disclosure, and FIG. 8 is a perspective view of a tunnel 96 that is associated with SCO station 20, and that is configured to capture images of container 30 according to one embodiment of the present disclosure As seen in FIG. 7, camera 14 is a ceiling-mounted camera having a field of view that includes scale 22. Thus, when a customer scans or weighs a container 30, camera 14 can capture a first image of the container along with the items that are in the container. That image is then sent to network node 16, which analyzes the image as previously described to identify the first item in the container. Once the customer has weighed container 30, he/she can place container 30 on a conveyor belt 92 to be transferred through a tunnel 96 to a bagging area 94. As container 30 moves through tunnel 96 on belt 92, a camera 90 mounted within tunnel 96 captures a second, different image of container 30 along with its contents. The captured second image is also sent to network node 16 for analysis, as previously described, and the results used to determine the identity of the second item. For example, network node 16 may identify the second item using method 60 instead of merely determining that the second item is present in container 30. Such identification allows network node to send a control signal to SCO station 20 to cause it to automatically add the second item to the list of items for which the customer will be charged.

Figure 9:
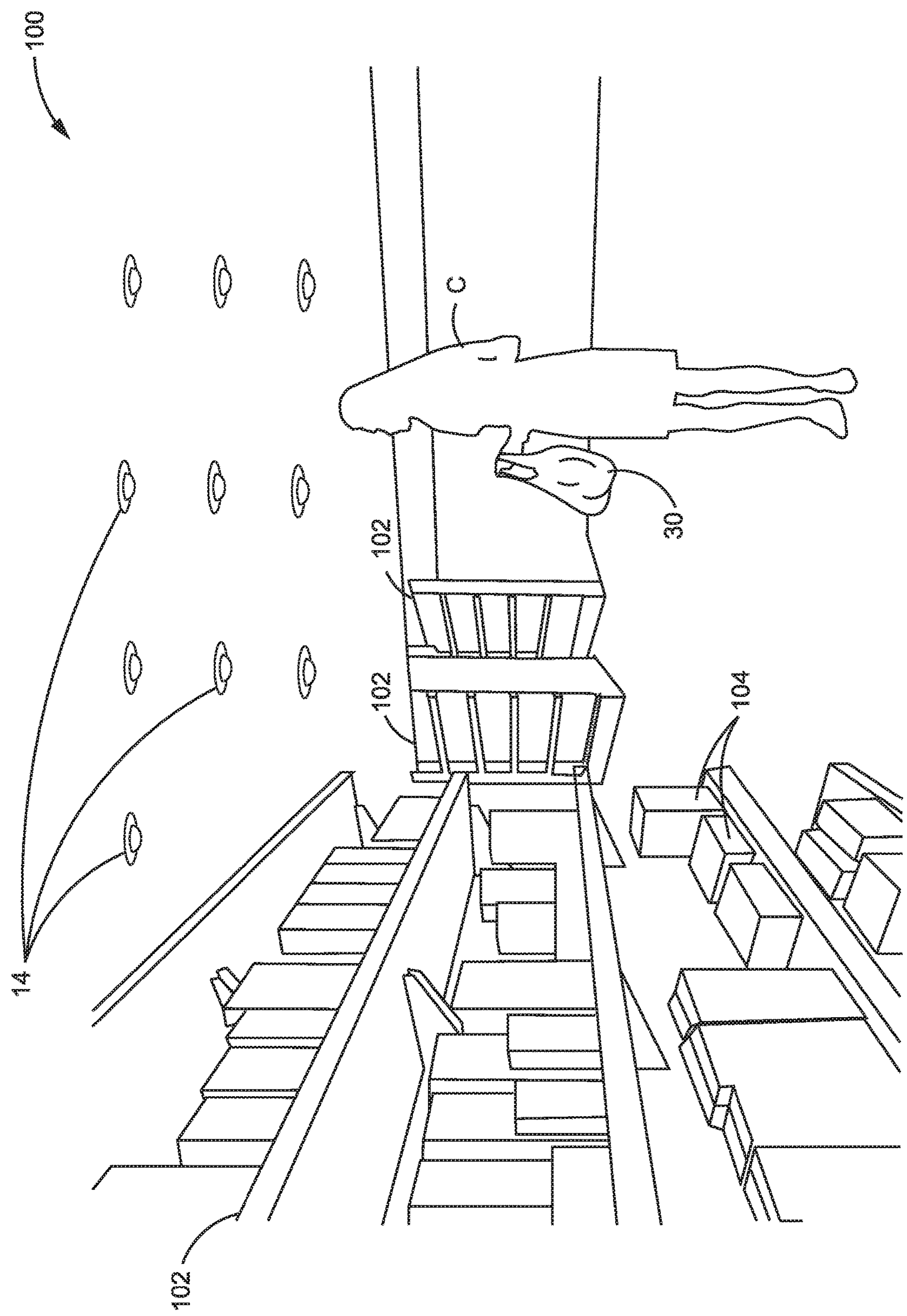
FIG. 9 is a perspective view illustrating a frictionless retail establishment configured to function according to one embodiment of the present disclosure.

In addition to the conventional manned checkout and SCO stations, the present embodiments may also be utilized in a "frictionless" retail environment, such as the one seen in FIG. 9. As seen in FIG. 9, frictionless system 100 covers the floor of a retail store having a plurality of cameras 14 distributed on the ceiling throughout the store, a plurality of shelves 102 for displaying items 104 for purchase by a customer C.

As is known in the art, frictionless systems generally do not require staff, such as cashiers, although there may be some staff present to assist customers in locating items, for example. Further, at least some frictionless systems, such as the one seen in FIG. 9, do not have Point of Sale (POS) devices (e.g., SCO stations 20) to allow customers to scan selected items 104 for purchase. Rather, these types of systems identify the items 104 for purchase by the customer as the customer selects the items 104 from the shelf 102, and then automatically charge the customer's account to pay for the selected items 104. The result is a convenient, seamless shopping experience for a customer.

However, as stated above, frictionless systems 100 are just as susceptible to customer theft. To help prevent such theft, however, cameras 14 may capture one or more images of container 30 from various angles, and send those images to network node 16. Upon receipt, network node 16 would digitally analyze the images, as previously described, to determine whether container 30 contains a first item the customer intends to purchase, as well as a second item that is different from the first item. If a second item does exist in container 30, network node can output a signal indicating its presence in container 30, as previously described.

Figure 10:
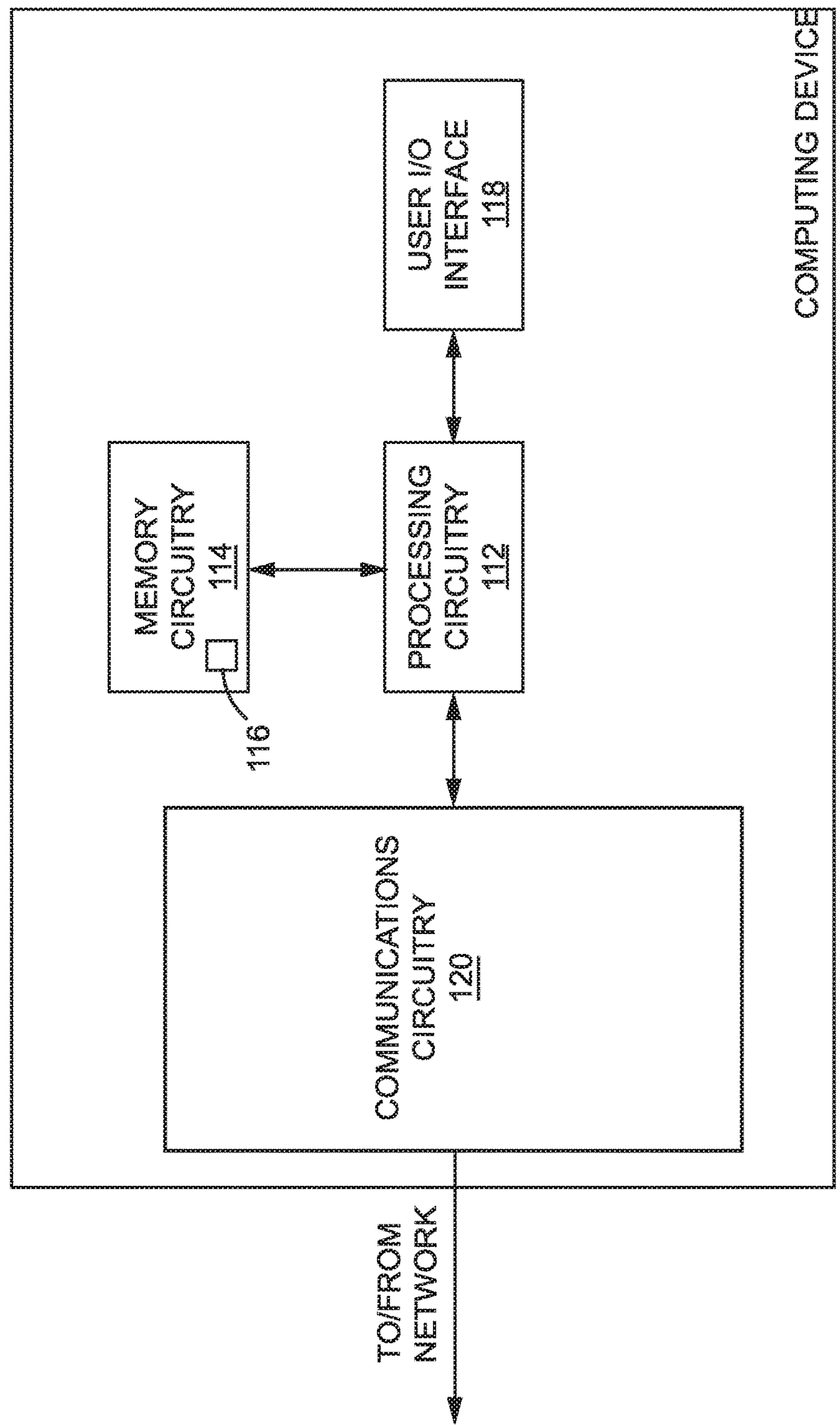
FIG. 10 is a functional block diagram of computing device configured to prevent theft at the retail store according to one embodiment of the present disclosure.

FIG. 10 is a functional block diagram of computing device 110, such as network node 16, configured to prevent theft at the retail store according to one embodiment of the present disclosure. It should be noted that while FIG. 10 illustrates the computing device 110 as being network node 16, this is for illustrative purposes only. The computing device 110 may, in some embodiments, be a computing device associated with an SCO station 20.

As seen in FIG. 10, computing device 110 and comprises processing circuitry 112, memory circuitry 114 storing a control program 116, a user input/output (I/O) interface 118, and a communications circuitry 120. Processing circuitry 112 comprises one or more microprocessors, hardware circuits, firmware or a combination thereof. In the exemplary embodiments described herein, processing circuitry 112, as previously described, is configured to analyze the images captured of a container 30, and identify a first item the customer wants to purchase in that container. Additionally, as previously described, processing circuitry 112 is configured to determine whether container 30 also contains a second item that is different from the first item. In particular, processing circuitry 112 is configured according to the present embodiments to determine whether the customer may be attempting to steal the second item, and in response, either notify a store operator or control a SCO station 20 to automatically charge the customer for the second item, as previously described.

Memory circuitry 114 comprises a non-transitory computer readable medium that stores executable program code and data used by the processing circuitry 112 for operation. In this embodiment, the program code and data comprises a control program 116 that, when executed by processing circuitry 112, configures the computing device 110 to perform the functions previously described. In some embodiments, control program 116 has access to customer preference information that, as previously described, can be utilized to identify the items in container 30. Memory 114 may include both volatile and non-volatile memory, and may comprise random access memory (RAM), read-only memory (ROM), and electrically erasable programmable ROM (EEPROM) and/or flash memory. Additionally or alternatively, memory 114 may comprise discrete memory devices, or be integrated with one or more microprocessors in the processing circuitry 112.

The user I/O interface 118 comprises one or more input devices and display devices to enable a user to interact with computing device 110. Such devices may comprise any type of device for inputting data into a computing device including, but not limited to, keyboards, number pads, push buttons, touchpads, touchscreens, or voice activated inputs. The display devices that comprise user I/O interface 118 may comprise, for example, a liquid crystal display (LCD) or light emitting diode (LED) display, or a touchscreen display that also functions as a user input device.

The communications circuitry 120 comprises, in one embodiment, a transceiver circuit and/or interface circuit for communicating with remote devices, such as SCO station 20, cameras 14, and DB 18 over network 12, as previously described. For example, using communications circuitry 120, computing device 110 receives digital images captured by cameras 14, as previously described, as well as any user input entered by the customer. In this regard, communications circuitry 120, according to embodiments of the present disclosure, may comprise a WiFi interface, a cellular radio interface, a BLUETOOTH interface, an Ethernet interface, or other similar interface for communicating over a communication network or a wireless communication link.

Figure 11:
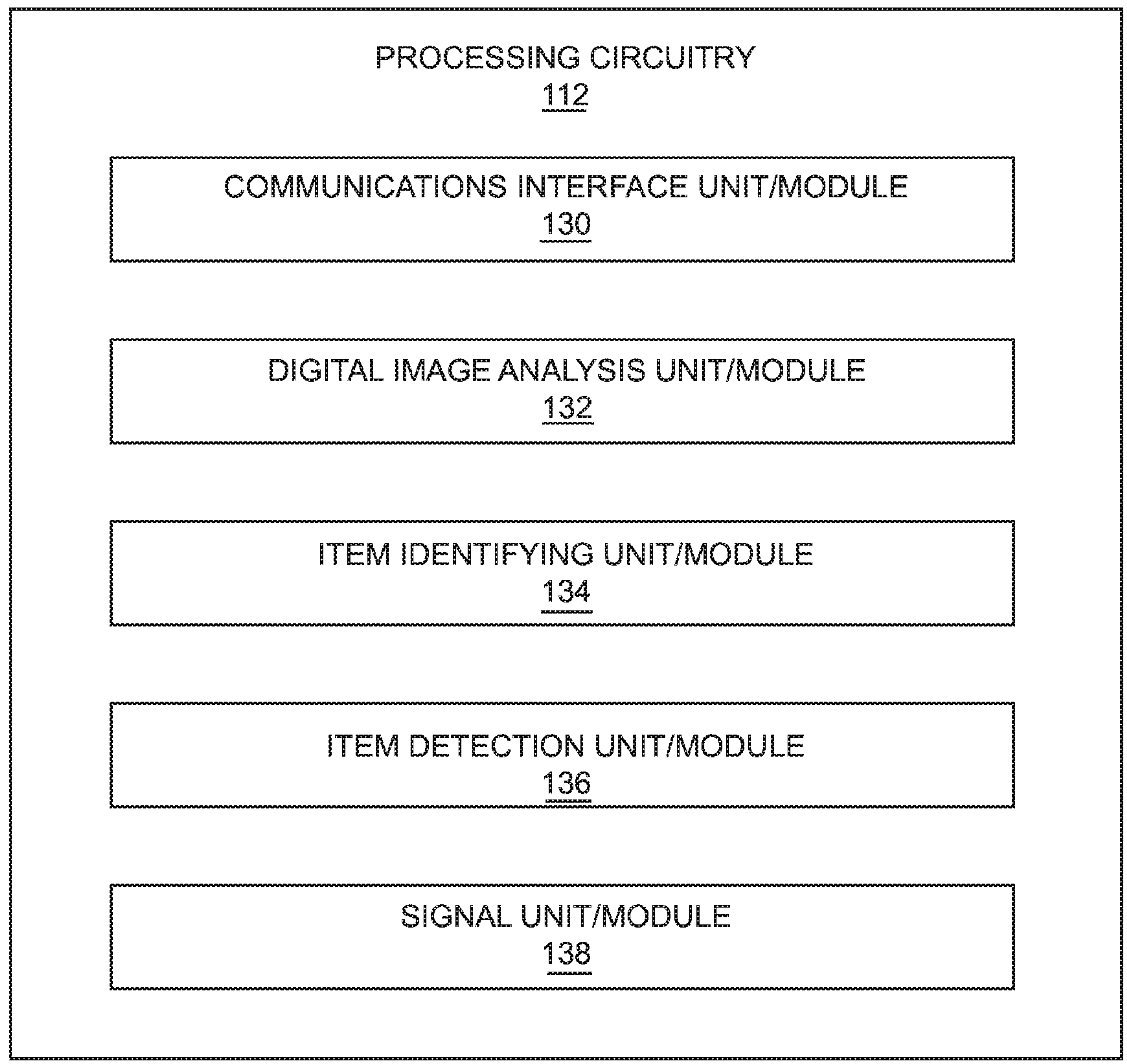
FIG. 11 is a schematic block diagram of a computer program product that configures a computer to prevent theft at the retail store according to one embodiment of the present disclosure.

FIG. 11 is a schematic block diagram of a computer program product that configures a computer, such as computing device 110, to prevent theft at the retail store according to one embodiment of the present disclosure. As seen in FIG. 11, the control program 116 comprises a plurality of units/modules including a communications interface unit/module 130, a digital image analysis unit/module 132, an item identifying unit/module 134, an item detection unit/module 136, and a signal unit/module 138.

The communications interface unit/module 130 comprises program code that is executed by processing circuitry 112 to facilitate communicating data and information with one or more other devices (e.g., cameras 14, SCO stations 20, DB 18) via IP network 12. The digital image analysis unit/module 132 comprises program code that is executed by processing circuitry 112 to perform the digital image analysis on the images received from cameras 14, as previously described. It should be noted that the algorithms and techniques used by digital image analysis unit/module 132 to analyze the digital images are well-known, and thus, not described in detail here. The item identifying unit/module 134 comprises program code that is executed by processing circuitry 112 to identify the items that are in container 30 based, at least in part, on the results of the digital image analyses performed by the digital image analysis unit/module 132. The item detection unit/module 136 comprises program code that is executed by processing circuitry 112 to detect the presence of a second item in container 30 along with the first item. As previously described, the image detection unit/module 136 may merely detect the presence of the second item and need not positively identify the second item. The signal unit/module 138 comprises program code that is executed by processing circuitry 112 to output a signal indicating that the second item is in container 30. As previously described, the signal may comprise a message sent to a store operator informing that operator that a customer may be attempting to steal items from the store. Alternatively, the signal may comprise a control signal that is sent to the SCO station 20. The control signal may be a message that identifies the second item such that, upon receipt, the SCO station 20 automatically charges the second item to the customer's account.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method, implemented at a computing device associated with a self-checkout (SCO) station of a retail store, for preventing theft at the retail store, the method comprising:
- receiving one or more images of a container, wherein the one or more images are captured by a camera at the retail store, and wherein a plurality of items selected by a customer are in the container;
- receiving a weight from a scale at the SCO station, wherein the weight comprises an aggregate weight of a first item the customer intends to purchase and a second item that the customer does not intend to purchase, and wherein both the first and the second items are in the container;
- performing first and second digital image analyses on the one or more images of the container;
- based on the first digital image analysis, identifying the first item in the container that the customer intends to purchase, wherein identifying the first item comprises:
  - calculating a first confidence value indicating an extent to which one or more characteristics of the first item matches one or more characteristics of an inventory item; and
  - identifying the first item as being the inventory item responsive to determining that the first confidence value equals or exceeds a first confidence threshold;
- based on the second digital image analysis:
  - determining that the second item is in the container responsive to determining that the second item is different than the first item, wherein the second item is at least partially obscured from a view of the camera by the first item, and wherein determining that the second item is different than the first item comprises:
    - calculating a second confidence value indicating an extent to which the second item is different than the first item; and
    - determining that the second item is different from the first item responsive to the second confidence value equaling or exceeding a second confidence threshold;
  - identifying the second item that is in the container and at least partially obscured from a view of the camera by the first item;
  - generating a control signal to send to the SCO station that:
    - indicates to the SCO station that the second item is in the container; and
    - controls the SCO station to add the second item to a list of items for which the customer will be charged; and
  - sending the control signal to the SCO station.

2. The method of claim 1 wherein performing the first and second digital image analyses on the one or more images of the container comprises:
- performing the first digital image analysis on the one or more images to identify the first item the customer intends to purchase; and
- performing the second digital image analysis on the one or more images to determine that the second item is in the container, wherein the second digital image analysis is performed independently from the first digital image analysis.

3. The method of claim 2 wherein the first and second digital image analyses are performed on the same one or more images.

4. The method of claim 2 wherein the one or more images comprise first and second digital images of the container captured independently of each other, and wherein the first digital image analysis is performed on the first digital image and the second digital image analysis is performed on the second digital image.

5. The method of claim 1 wherein identifying the first item in the container further comprises identifying the first item based on input provided by the customer and received from the SCO station.

6. The method of claim 1 further comprising storing, in a database, information describing characteristics for each of a plurality of inventory items, and wherein identifying the first item in the container further comprises:
- determining the one or more characteristics of the first item based on the first digital image analysis; and
- comparing the one or more characteristics of the first item to the one or more characteristics of the inventory item.

7. The method of claim 6 wherein determining that the second item is in the container comprises determining one or more characteristics of the second item based on the second digital image analysis, and wherein calculating the second confidence value comprises calculating the extent to which the one or more characteristics of the second item do not match the one or more characteristics of the inventory item, and/or the one or more characteristics of the first item.

8. The method of claim 7 wherein determining that the second item is in the container further comprises digitally removing the first item from the one or more images of the container.

9. The method of claim 1 wherein determining that a second item is in the container is based on detecting:

an edge of the second item;

a substantially right angle of the second item;

a substantially straight line of the second item;

a color of the second item;

a weight of the second item;

one or more physical dimensions of the second item;

alpha-numeric text printed on the second item; and optically encoded data printed on the second item.

10. A computing device in a network associated with a self-checkout (SCO) station of a retail store, the computing device comprising:

communications interface circuitry configured to communicate via a communications network; and processing circuitry operatively connected to the communications interface circuitry and configured to:

receive one or more images of a container, wherein the one or more images are captured by a camera at the retail store, and wherein a plurality of items selected by a customer are in the container;

receive a weight from a scale at the SCO station, wherein the weight comprises an aggregate weight of a first item the customer intends to purchase and a second item that the customer does not intend to purchase, and wherein both the first and the second items are in the container;

perform first and second digital image analyses on the one or more images of the container;

based on the first digital image analysis, identify the first item in the container that the customer intends to purchase, wherein to identify the first item the processing circuitry is configured to:

calculate a first confidence value indicating an extent to which one or more characteristics of the first item matches one or more characteristics of an inventory item; and identify the first item as being the inventory item responsive to determining that the first confidence value equals or exceeds a first confidence threshold;

based on the second digital image analysis:

determine that a second item is in the container responsive to determining that the second item is different than the first item, wherein the second item is at least partially obscured from a view of the camera by the first item, and wherein to determine that the second item is different than the first item the processing circuitry is configured to:

calculate a second confidence value indicating an extent to which the second item is different than the first item; and determine that the second item is different from the first item responsive to determining that the second confidence value equals or exceeds a second confidence threshold;

identify the second item that is in the container and at least partially obscured from a view of the camera by the first item;

generate a control signal to send to the SCO station via the communications interface circuitry that:

indicates to the SCO station that the second item is in the container; and controls the SCO station to add the second item to a list of items for which the customer will be charged; and sending the control signal to the SCO station.

11. The computing device of claim 10 wherein to perform the first and second digital image analyses on the one or more images of the container, the processing circuitry is configured to:

perform the first digital image analysis on the one or more images to identify the first item the customer intends to purchase; and perform the second digital image analysis on the one or more images to determine that the second item is in the container, wherein the second digital image analysis is performed independently from the first digital image analysis.

12. The computing device of claim 11 wherein the processing circuitry is configured to perform the first and second digital image analyses at different times on the same one or more images.

13. The computing device of claim 11 wherein the one or more images comprise first and second digital images of the container captured independently of each other, and wherein the processing circuitry is configured to perform the first digital image analysis on the first digital image and the second digital image analysis on the second digital image.

14. The computing device of claim 10 wherein the processing circuitry is configured to identify the first item based on input provided by the customer and received from the SCO station.

15. The computing device of claim 10 wherein the processing circuitry has access to a database that stores characteristics for each of a plurality of inventory items, and wherein to identify the first item in the container, the processing circuitry is further configured to:

determine one or more characteristics of the first item based on the first digital image analysis; and compare the one or more characteristics of the first item to the one or more characteristics of the inventory item.

16. The computing device of claim 15 wherein to determine that that the second item is in the container, the processing circuitry is configured to determine one or more characteristics of the second item based on the second digital image analysis, and wherein to calculate the second confidence value, the processing circuitry is configured to calculate the extent to which the one or more characteristics of the second item do not match the one or more characteristics of the inventory item, and/or the one or more characteristics of the first item.

17. The computing device of claim 10 wherein to determine that the second item is in the container, the processing circuitry is further configured to digitally remove the first item from the one or more images of the container.

18. The computing device of claim 10 wherein the processing circuitry is further configured to communicate a message to a representative of the retail store indicating that the second item is in the container.

19. A non-transitory computer readable medium comprising computer program code stored thereon that, when executed by the processing circuitry of a computing device associated with a self-checkout (SCO) station of a retail store, configures the computing device to:

receive one or more images of a container, wherein the one or more images are captured by a camera at the retail store, and wherein a plurality of items selected by a customer are in the container;

receive a weight from a scale at the SCO station, wherein the weight comprises an aggregate weight of a first item the customer intends to purchase and a second item that the customer does not intend to purchase, and wherein both the first and the second items are in the container;

perform first and second digital image analyses on the one or more images of the container;

based on the first digital image analysis, identify the first item in the container that the customer intends to purchase, wherein to identify the first item, the program code, when executed by the processing circuitry, configures the computing device to:

calculate a first confidence value indicating an extent to which one or more characteristics of the first item matches one or more characteristics of an inventory item; and identify the first item as being the inventory item responsive to determining that the first confidence value equals or exceeds a first confidence threshold;

based on the second digital image analysis:

determine that the second item is in the container responsive to determining that the second item is different than the first item, wherein the second item is at least partially obscured from a view of the camera by the first item, and wherein to determine that the second item is different than the first item, the program code, when executed by the processing circuitry, configures the computing device to:

calculate a second confidence value indicating an extent to which the second item is different than the first item; and determine that the second item is different from the first item responsive to determining that the second confidence value equals or exceeds a second confidence threshold;

identify the second item that is in the container and at least partially obscured from a view of the camera by the first item;

generate a control signal to send to the SCO station that:

indicates to the SCO station that the second item is in the container; and controls the SCO station to add the second item to a list of items for which the customer will be charged; and send the control signal to the SCO station.

* * * * *